United States Patent [19]

Bangs

[11] 4,274,395
[45] Jun. 23, 1981

[54] SOLAR ENERGY ABSORBER

[76] Inventor: John R. Bangs, 12 Randall Rd., Princeton, N.J. 08540

[21] Appl. No.: 945,648

[22] Filed: Sep. 25, 1978

[51] Int. Cl.³ ............................................. F24J 3/02
[52] U.S. Cl. .................................... 126/432; 126/450
[58] Field of Search ............. 126/417, 432, 442, 443, 126/444, 450, 901, 441, 449

[56] References Cited

U.S. PATENT DOCUMENTS

| 3,951,129 | 4/1976 | Brantley, Jr. | 126/441 |
|---|---|---|---|
| 3,974,822 | 8/1976 | Patil | 126/450 |
| 3,981,293 | 9/1976 | Gillery | 126/901 X |
| 3,996,918 | 12/1976 | Quick | 126/432 |
| 4,062,351 | 12/1977 | Hastwell | 126/432 X |
| 4,073,283 | 2/1978 | Löf | 126/432 X |
| 4,078,548 | 3/1978 | Kapany | 126/441 X |
| 4,130,108 | 12/1978 | Patil | 126/901 |
| 4,136,669 | 1/1979 | Lane | 126/450 |
| 4,175,542 | 11/1979 | Duchene | 126/449 |
| 4,201,196 | 5/1980 | Zani | 126/449 X |

Primary Examiner—Samuel Scott
Assistant Examiner—Randall L. Green
Attorney, Agent, or Firm—Gary M. Nath

[57] ABSTRACT

A solar heat collector is disclosed having a cover plate mounted in spaced relation with a solar energy absorber and having interposed between said cover plate and solar absorber an infrared absorber material.

7 Claims, 3 Drawing Figures

SOLAR ENERGY ABSORBER

FIELD OF THE INVENTION

This invention relates to solar energy absorbers and in particular to a solar heat collector. More especially, this invention relates to a low cost solar heat collector for heating homes, farm buildings, greenhouses, swimming pool enclosures, and the like, or for supplementing heat from conventional fuel sources which is provided with means for reducing heat loss and maximizing heat transfer from the heat absorbing materials to the heat transfer media.

DESCRIPTION OF THE PRIOR ART

Conventional flat-plate collectors generally consist of a black radiation-absorbing surface backed by insulation and covered by one or more layers of transparent covers. See for example Yu U.S. Pat. No. 3,943,911, Gillery U.S. Pat. No. 3,981,293 and Rosenberg U.S. Pat. No. 4,056,094.

Solar radiation is transmitted through the transparent cover and absorbed by the black surface. The absorbed solar heat can be removed by air, water, or other suitable heat transfer fluid passed in heat exchanging relationship with the heated surface. As described in a publication entitled "Solar Energy Utilization for Heating and Cooling" compiled by John Yellot, Arizona State University and referenced as NSF 74-41, the prior art approaches to solar heat collectors have been numerous, with each possessing deficiencies affecting the overall operation and efficiency of the solar heat collector. In some of the prior art designs, the heat transfer media flows in tubes or along troughs, which devices result in heat loss by convection, reflection or evaporation into the environment. If the tube design, the entire absorber surface is exposed and thus radiates heat upwards and outwards. In the trough design, those portions of the absorber which are exposed will radiate heat upwards and cause evaporation.

One effort to reduce heat loss and accordingly improve operation efficiency is described by Gillery in U.S. Pat. No. 3,981,293. This patent discloses use of a solar energy absorber and a cover plate, wherein the latter has a preselected transmittance coefficient for solar radiation in the wavelength range of 0.3 to 2.1 microns and a reflectance coefficient for infrared radiation in the wavelength range of about 2 to 15 microns. Although heat loss is reduced by using such coatings, similar approaches are not completely satisfactory because of the increased weight and/or cost which makes the already expensive collector even more expensive to purchase and difficult to construct.

SUMMARY OF THE INVENTION

This invention relates to an improved heat collector of the type having at least one cover plate for transmitting solar radiation mounted in spaced relation to means for absorbing solar radiation and having interior disposed between both means, at least one infrared absorbing member having peripheral dimensions smaller than said cover plate and absorber means. The improvement includes facilities for permitting turbulant flow of a heat transfer fluid through solar collector in close proximity to said absorber and infrared absorbing member to maximize heat transfer and efficiency.

DETAILED DESCRIPTION OF THE INVENTION

Figure 1:
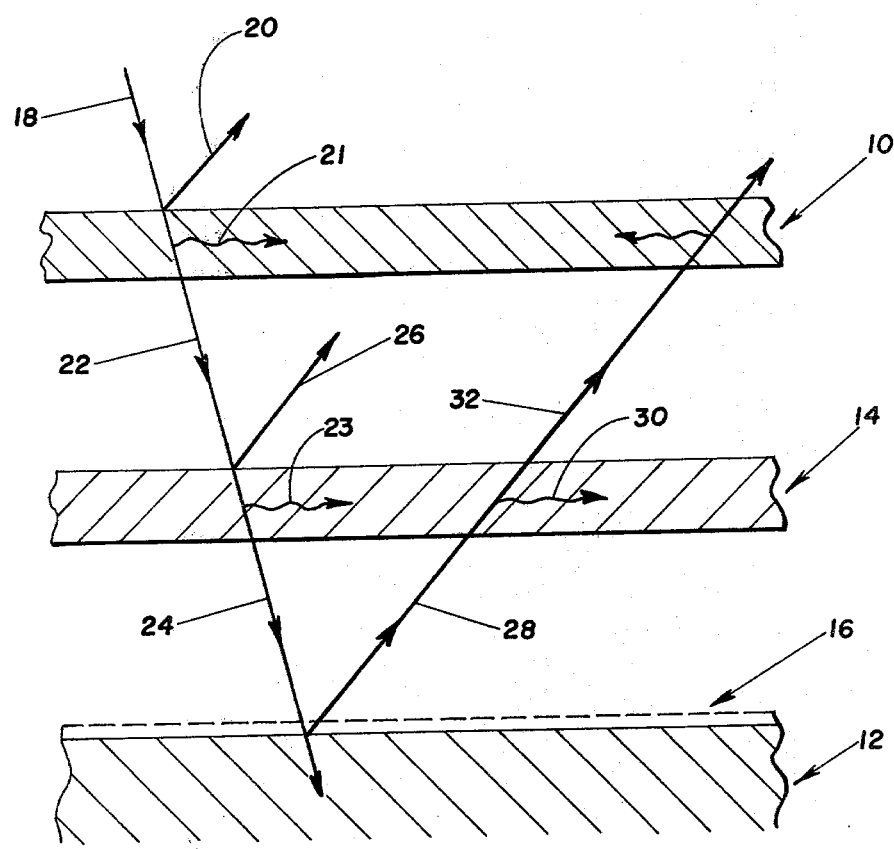
FIG. 1 is an illustrative view of the radiation energy balance of a solar heat conductor in accordance with the teachings of the invention.

With reference to FIG. 1, this invention, in general, relates to a solar heat collector including a cover plate 10 mounted in spaced relation to a solar heat absorber 12 having interior disposed therebetween an infrared absorbing member 14.

Cover plate 10 can be comprised of any suitable material which will readily allow solar rays to be transmitted rather than reflected. It may comprise a transparent plastic material, preferably an acrylic material resistant to ultraviolet rays, or other material such as ultraviolet resistant mylar, or glass. If desired, multiple transparent members can be employed in generally laminar construction with a void space between each member. For purposes of achieving greatest efficiency within a reasonable economic limit, however, it is preferred that one member be provided, that is merely an exterior exposed cover plate.

The infrared absorbing material may be selected from a wide range of commercially available materials which are capable of transmitting at least 40 percent of the total solar ray and preferably 45 to 65 percent, and at least 45 percent of the total visible light ray and preferably 50 to 70 percent entering the collector. Use of an infrared absorbing material having such properties permits the efficient transmittance of visible energy rays to the absorber; maximizes infrared absorportion; and concomitantly minimizes radiant energy loss. As such, the infrared absorber serves to pass the solar radiation to absorber 12 while absorbing significant amounts of infrared energy which was previously trapped between the cover plate and absorber in prior art devices.

The absorber 12 has a surface 16 that has a high absorptive potential. If desired, absorber 12 may be darkened so as to absorb solar energy radiation up to 1.5 microns in wavelength and transmit heat, primarily as reradiated infrared rays, to the air flowing above. The absorber may optionally contain a heat insulative base, formed from conventional insulating materials, such as asbestos board, fiber board, cellular glass, foamed and cellular polymeric material such as freon blown urethane foam, polystyrene, polyurethane and the like. When used, a sheet or layer of surface 16 material overlies the insulative base. The surface 16 may be rigid or flexible preferably in the form of a blackened plate or film such as a painted metal sheet or dyed or pigmented polymer rigid or semi-rigid sheet or film.

The solar heat collector is characterized by the energy balance diagramed in FIG. 1 which approximates using a solar energy ray 18 having a total solar radiation of 100% (49% visible and UV—below 0.7 microns wavelength and 51% IR—above 0.7 microns wavelength.) When solar energy ray 18 impinges on the outer surface of cover plate 10, a portion of the energy of ray 18 is lost due to reflectance ray 20 (5% with 5 mm. thick glass) and absorption ray 21 (3% with 5 mm.

thick glass). The remaining energy, 92% of ray 18 passes through the cover plate 10 as transmitted solar energy ray 22 which then impinges on infrared absorber material 14.

The infrared absorber material 14 absorbs a significant amount of infrared rays (about 34%) as well as some solar radiation (about 10%) as ray 23 while transmitting ray 24 to absorber 12. A portion of ray 22 is reflected toward the inner surface of cover plate 10 and is shown as internal ray 26.

As absorber 12 absorbs the solar energy from ray 24 (35% solar radiation and 13% infrared radiation), it begins to heat up and emit infrared energy ray 28 back toward infrared absorber 14 which absorbs a portion of ray 28 as absorbed energy ray 30. About 43% of the infrared energy is re-radiated from absorber 12, of which a substantial portion was heretofore lost. By employing infrared absorber 14, approximately 31% of the total entering solar ray is reabsorbed as infrared radiation. The remaining portion of infrared energy (about 12%) is lost to the solar heat collector due to absorption and transmittance through cover plate 10 as ray 32. This results in a net energy efficiency of approximately 78% whereas in the absence of an infrared absorber material maximum efficiency is merely about 64%.

Figure 2:
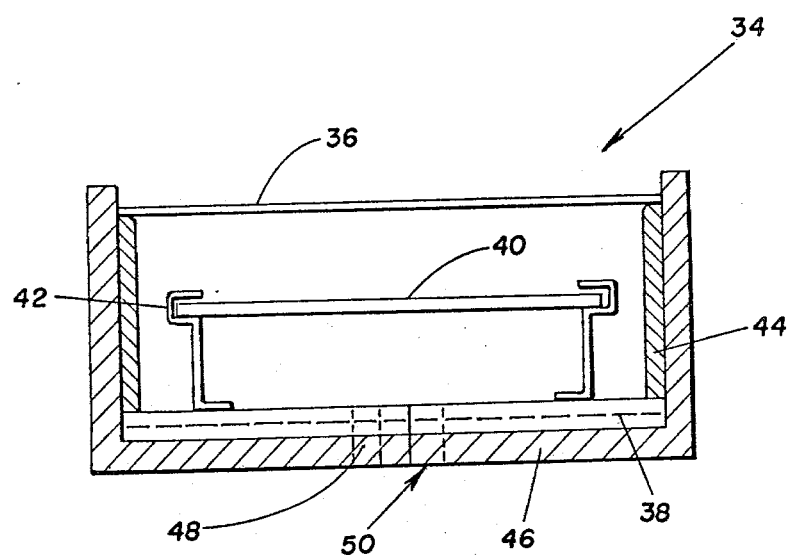
FIG. 2 is a side elevation, in section, showing a solar heat collector embodying the invention.
Figure 3:
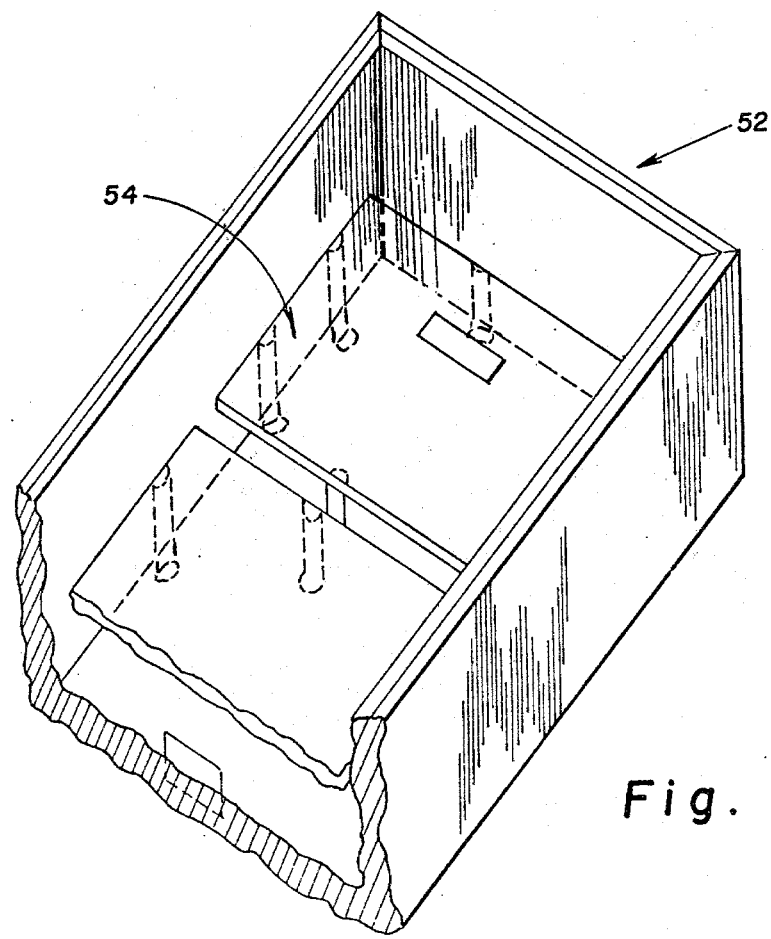
FIG. 3 is an isometric view of a solar heat collector in accordance with the teachings of the invention, having portions removed for purposes of clarity.

FIGS. 2 and 3 show various views of a solar heat collector embodying teachings of this invention. As can be appreciated, the solar heat collectors are presented for illustration purposes only.

Shown in FIG. 2 is a solar heat collector 34 including cover plate 36 mounted at the parameters in spaced relation to absorber 38, each having the same peripheral dimensions and shape. Interposed between them is infrared absorber material 40 having peripheral dimensions smaller than said cover plate and said absorber.

Cover plate 36 and absorber 38 are fastened at their perimeters by suitable cement of other fastening means which are selected to be leak proof, chemically resistant, non-volatile and able to withstand expansion and contraction. Infrared absorber material 40 is preferably fastened approximately equaldistance from cover plate 36 and absorber 38 with any means suitable for maintaining the infrared absorber in place without sealing its perimeter. Suitable means include clamp-type means such as clamps 42, flexible clamps with rivets, screw-grommet means or mechanical designs that maintain their bonding and locking characteristics in tension, and compression.

The distance between the cover plate, infrared absorber and absorber is not critical to practice the invention. To reduce heat loss by conduction, it is preferred to have a distance of ½ inch to 4 inches between each material.

To reduce heat losses due to conduction, the cover plate and absorber may be mounted in a heat insulating box, such as to provide insulation on sidewalls 44 and bottom 46.

The heat transfer fluid, which is preferably in gaseous form and most preferably air, is caused to flow in one direction in turbulent form from inlet trough 48 to outlet trough 50. The flow must be fast enough to permit turbulent flow of the heat transfer fluid through the collector in close proximity to the absorber and infrared absorber material. Air speed is critical only to the extent necessary to achieve effective heat transfer by ensuring turbulent flow of the heat transfer fluid. The random eddies, i.e. swirling motion of the fluid, which occur in turbulent flow, serve to minimize the thickness of the still air layer next to any solid surface by a scouring action. The thermal conductivity through the still air layer is thus increased and thus transfer of energy to the heat transfer fluid is enhanced.

FIG. 3 shows in isometric view a solar heat collector in accordance with the teachings of the invention. The solar heat collector is similar in construction to the solar heat collector of FIG. 2 except that FIG. 3 depicts multiple infrared absorbing materials 54. The use of multiple absorbing materials aids in air flow circulation and inducement of turbulent flow.

The invention being thus described, it will be obvious that minor variations may be made without departing from the spirit and scope of the invention. Such variations are intended to be within the scope of the invention as set forth in the claims.

What is claimed is:

1. A solar heat collector, comprising:
   (a) at least one cover plate capable of passing solar energy having a major surface with predetermined peripheral dimensions and shape;
   (b) a solar energy absorber having peripheral dimensions and shape similar to said cover plate;
   (c) at least one infrared absorbing member interiorly supported, disposed and spaced between said cover plate and solar energy absorber and having peripheral dimensions smaller than said cover plate and said solar energy absorber;
   (d) means for mounting said cover plate and solar energy absorber in spaced relation with said infrared absorbing member;
   (e) inlet means defining an area through which a heat transfer fluid may pass into said collector under, above, and around the infrared absorbing member to permit turbulent flow of the heat transfer fluid through the collector in close proximity to said absorber and infrared absorbing member; and
   (f) outlet means defining an area through which the heat transfer fluid passes out of said collector.

2. The solar heat collector of claim 1 wherein said mounting means is a rigid spacer frame having peripheral dimensions and shape similar to said cover plate, and solar energy absorber, said frame mounting marginal edge portions of the major surfaces of said cover plate and said solar energy absorber to provide a compartment therebetween.

3. The solar heat collector of claim 2 wherein said infrared absorbing member is mounted by supporting means between said cover plate and said solar energy absorber.

4. The solar heat collector of claim 3 which includes clamping means for supporting said infrared absorbing member between said cover plate and said absorber.

5. The solar heat collector of claim 1 wherein said cover plate is glass.

6. The solar heat collector of claim 1 wherein said heat transfer fluid is air.

7. The solar heat collector of claim 1 wherein said cover plate is a transparent plastic material.

* * * * *